United States Patent Office 3,462,445
Patented Aug. 19, 1969

3,462,445
CERTAIN ACYCLIC, AROMATIC AND HETERO-AROMATIC UREA DERIVATIVES OF TRICYCLO[2,2,1,0$^{2,6}$]HEPTANES AND INTERMEDIATES THEREFOR
Gerhard Muller, Leverkusen, and Wolfgang Behrenz, Cologne-Stammheim, Germany, assignors to Farbenfabriken Bayer Aktiengesellschaft, Leverkusen, Germany, a corporation of Germany
No Drawing. Filed Feb. 3, 1966, Ser. No. 524,851
Claims priority, application Germany, Feb. 5, 1965, F 45,158
Int. Cl. C07d 27/00, 87/28; C07c 127/12
U.S. Cl. 260—295                                9 Claims

ABSTRACT OF THE DISCLOSURE

Nortricyclyl - 3 - amides, i.e., N - [tricyclo(2,2,1,0$^{2,6}$)heptyl-3]amides or 3-amido-tricyclo(2,2,1,0$^{2,6}$)heptanes, which possess insect-repelling and mite-repelling properties, and which may be produced by conventional methods.

---

The present invention relates to particular new nortricyclyl-2-amides (i.e., N-[tricyclo(2,2,1,0$^{2,6}$)heptyl-3]amides or 3-amido-tricyclo(2,2,1,0$^{2,6}$)heptanes) which have insect- and mite- repelling properties, to their compositions with carrier vehicles, and to the preparation and use thereof.

It is known that dimethyl phthalate, caprylic acid diphenylamide and, especially, m-toluylic acid-N,N-diethylamide, can be used as insect repellants. These compounds have already achieved considerable practical importance. They possess a repellant action which lasts for several hours.

It is an object of the present invention to provide particular new nortricyclic-3-amides which possess valuable pest-repelling, and especially insect- and mite-repelling, properties; to provide active compositions in the form of mixtures of such compounds with liquid and solid dispersible carrier vehicles; and to provide methods of using such compounds in a new way, especially for combating or repelling pests, such as insects and mites, and the like.

Other and further objects of the present invention will become apparent from a study of the within specification and accompanying examples.

It has now been found in accordance with the present invention that the particular new nortricyclyl-3-amides, or N-[tricyclo(2,2,1,0$^{2,6}$)heptyl - 3]amides, or 3 - amido-tricyclo (2,2,1,0$^{2,6}$)heptanes, of the general formula $$\text{[structure]}-\text{NH}-\text{CO}-\text{R} \qquad \text{(I)}$$

in which R represents a member selected from the group consisting of hydrogen and the radical $$-\text{N}\begin{matrix}\text{R}'\\ \text{R}''\end{matrix}$$

in which R' and R" each respectively is selected from the group consisting of hydrogen and substituted and unsubstituted radicals selected from the group consisting of alkyl having 1–18 carbon atoms, alkenyl having 2–6 carbon atoms, alkynyl having 2–6 carbon atoms, cycloalkyl having 5–6 carbon atoms, phenyl, naphthyl, and nortricycloheptyl, with the proviso that R' and R" when taken together with the adjacent N atom form a heterocyclic radical having 5–6 ring members, the corresponding substituted alkyl, alkenyl, alkynyl, cycloalkyl, phenyl, naphthyl, nortricycloheptyl and heterocyclic aforesaid radicals being substituted with a member selected from the group consisting of hydroxy, halo, lower alkyl having 1–4 carbon atoms, and mixtures of such substituents, exhibit strong pest-repelling, and most especially insect- and mite-repelling, properties.

It is very surprising that the particular new active compounds according to the present invention have a considerably higher repellent effect on insects and mites than the insect repellents known from the prior art. Thus, the particular active materials according to the present invention represent a valuable advance in the art.

The particular new compounds of general Formula I above can be prepared by a plurality of known processes. Where the instant compounds are ureas, they can be prepared, for example, by reacting nortricyclyl isocyanate with amines, or nortricyclyl-carbamic acid esters with amines, or nortricyclylamine with isocyanates, or even nortricyclylamine with carbamic acid chlorides.

The instant ureas are obtained in an especially favorable manner when, according to the first-mentioned process, nortricyclyl isocyanate of the formula $$\text{[structure]}-\text{NCO} \qquad \text{(IIa)}$$

is reacted with amines of the general formula $$\text{H}-\text{N}\begin{matrix}\text{R}'\\ \text{R}''\end{matrix} \qquad \text{(IIb)}$$

in which R' and R" are the same as defined above.

The starting nortricyclyl isocyanate is obtained from the known N-nortricyclyl carbamic acid ethyl ester (see German Patent 1,181,210) by reaction with diphenylmethane di-isocyanate and polyphenylmethyl polyisocyanate.

The amines which may be used herein are known. As examples, there may be mentioned ammonia; N-alkyl and N,N-dialkylamines such as methylamine, dimethylamine, methyl-ethylamine, diethylamine, diethanolamine, di-n-propylamine, isopropylamine, n-butylamine, di-n-butylamine, isobutylamine, diisobutylamine, tert.-butylamine, methyl-butylamine, di-octadecylamine, and the like; N-cycloalkyl and N,N-dicycloalkylamines such as cyclohexylamine, dicyclohexylamine, cyclopentylamine, and the like; N-alkyl-N-cycloalkylamines such as methyl-cyclohexylamine, and the like; N-aryl-, N,N-diaryl-, N-alkyl-N-aryl- and N-cycloalkyl-N-aryl-amines such as aniline, diphenylamine, methyl-aniline, p- and o-chloroaniline, cyclohexyl-phenylamine, naphthyl-amine, ethyl-naphthylamine, and the like; N-alkenyl-, N,N,-dialkenyl-, N-alkyl-N-alkenyl-, N-cycloalkyl-N-alkenyl-, and N-alkenyl-N-aryl-amines such as vinylamine, allylamine, diallylamine, methyl-allylamine, pentenyl-phenylamine, cyclohexyl-hexenylamine, and the like; -N-heterocyclic amines such as morpholine, piperidine, 4-methyl-2,5,6-trihydro-pyridine (i.e., 4-methyl-cyclo-1-aza-hexene-3), 2-amino-pyridine, and the like.

The reaction of the isocyanate with the amine in accordance with the invention can be carried out in the absence of or in the presence of diluents, such as water, alcohols, esters, ketones and aromatic hydrocarbons.

To accelerate the course of the reaction, there can be added advantageously tertiary amines, such as trimethylamine, and the like.

The reaction temperatures can be varied within a fairly wide range. In general, the operation is carried out at temperatures substantially between about 0 and 150° C.

The reaction is carried out, for example, by using equimolar amounts of the reaction components or with the use of an excess of the amine which is more easily obtainable.

Where the particular new compounds are simple carboxylic acid amides, then these are expediently prepared by reacting nortricyclylamine with carboxylic acids, carboxylic acid esters or carboxylic acid halides, as the case may be.

The instant carboxylic acid amides are obtained in an especially simple manner when nortricyclylamine of the formula

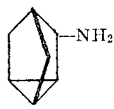

(IIc)

is reacted with carboxylic acid esters of the general formula

(IId)

in which R is the same as defined above and R''' represents a lower alkyl or phenyl radical.

The starting nortricyclylamine is obtained in a simple manner by the saponification of nortricyclyl-carbamic acid ethyl ester with potassium hydroxide (cf. German Patent 1,181,210).

The carboxylic acid esters which may be used herein are known. As examples, there may be mentioned the methyl-, ethyl-, phenyl-, and the like, esters of formic acid, acetic acid, chloro-acetic acid, propionic acid, butyric acid and benzoic acid.

The reaction of the amine with the carboxylic acid ester in accordance with the invention can be carried out in the presence of or in the absence of diluents, such as high boiling hydrocarbons, trichlorobenzene and diphenyl ether.

To accelerate the reaction, there can be added advantageously basic catalysts, such as sodium carbonate and potassium carbonate.

The reaction temperatures can be varied within a fairly wide range. In general, the operation is carried out at temperatures substantially between about 80 and 280° C., preferably between about 150 and 250° C.

The reaction and working up are carried out in the usual manner. Thus, equimolar amounts of the reaction components can be reacted or an excess of the ester can be used.

The particular new compounds according to the present invention advantageously have a low toxicity towards warm-blooded animals yet have a strong repellent activity against arthropods. The effect is long-lasting. The compounds can, therefore, be used with markedly good results for repelling noxious sucking, biting insects, mites, and the like.

Typical sucking insects contemplated herein essentially include mosquitoes, such as the species Aedes, Culex, Anopheles, and the like; sand flies such as Phlebotomes, and the like; biting flies, such as Culicoides species and the like; buffalo gnats, such as the Simulium types, and the like; stinging flies, such as the stable fly (*Stomoxys calcitrans*), the tsetse flies (Glossina species), horse flies, such as the Tabanus, Haemotopota and Chrysops species, and the like; the common housefly (*Musca domestica*); the lesser housefly (*Fannia canicularis*); the meat flies, such as *Sarcophaga carnaria*, and the like; flies causing myiasis, such as *Lucilia cuprina, Chrysomia chloropyga, Hypoderma bovis, Hypoderma lineata, Dermatobia hominis, Oestrus ovis, Gasterophilus intestinalis, Cochliomyia hominivorax*, and the like; bugs, such as *Cimex lectularius, Rhodnius prolixus, Triatoma infestans*, and the like; lice, such as *Pediculus humanus, Haemotopinus suis, Damalinia ovis*, and the like; keds, such as *Melophagus ovinus*, and the like; fleas, such as the human flea (*Pulex irritans*), *Ctenocephalus canis* and sand fleas, such as *Dermatophilus penetrans*, and the like.

Typical biting insects contemplated herein essentially include cockroaches, such as the German cockroach (*Blattella germanica*), the black beetle (*Blatta orientalis*), and the like; beetles, such as the grain weevil (*Sitophilus granarius*), the stag beetle (*Hylotrupes bajulus*), the death watch beetle (*Anobium punctatum*), the bread beetle (*Anobium paniceum*), the bacon beetle (*Dermestes lardarius*), the mealworm beetle (*Tenebrio molitor*), and the like; termites, such as *Reticulitermes lucifugus*, and the like; and ants, such as *Lasium niger*, and the like.

Typical mites contemplated herein include ticks, such as *Ornithodoros moubata, Boophilus microplus, Amblyomma hebraeum*, and the like; and mites in the stricter sense, such as *Dermanyssus gallinae* and *Sarcoptes scabiei*, and the like.

Thus, the new compounds of the instant invention can be used as pest repellents, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), animal and vegetable fats (for instance lanolin, olive oil and nut oil), amines (for instance ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 1 and 80%, preferably substantially between about 5 and 50% by weight of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.1 and 95% by weight of the mixture.

Furthermore, the present invention contemplates methods of selectively combating and/or repelling pests, such as insects and mites, which comprise applying to at least one of (a) such pests, and especially insects and mites, and (b) their habitat, a pest-repellent, especially insect-repellent and/or mite-repellent, effective amount of the particular active compound of the invention alone or together with a carrier vehicle as noted above. The instant formulations or compositions are applied in the usual manner, for example, by spraying, atomizing, vaporizing, scattering, dusting, sprinkling, pouring, and the like, and especially in connection with the applying of the active material to warm-blooded creatures, this is accomplished by rubbing or spraying the particular skin area with the active compound, formulation or composition, as the case may be.

In particular, for protection against blood-sucking insects and/or mites, the particular active materials in accordance with the present invention are either applied to human or animal skin, or clothes or other objects are impregnated therewith. For repelling pests which damage foodstuffs or other materials, such materials to be protected are either directly treated with the active agents of the invention or such agents are applied to the area surrounding the material to be protected whereby to provide a barrier zone against entry of the pests. As the artisan will appreciate, those formulations or compositions meant to be applied onto or in the vicinity of warm-blooded creatures and/or foodstuffs, or the like, will be free from any carrier vehicle which might be antagonistic to or significally toxic to such creatures, foodstuffs, or the like.

The following examples are set forth for the purpose of illustrating, while not limiting, utility of the particular new compounds according to the present invention:

EXAMPLE 1

Repellent test/mosquitoes

Test insect: *Aedes aegypti*
Solvent: alcohol

To produce a suitable preparation of the particular active compound, 5 parts by weight of such active compound are mixed with 100 parts by volume of the solvent.

The hair is shaved off from the backs of guinea pigs to an extent of 50 cm.$^2$, and 0.4 cc. of such preparation of the given active compound is uniformly distributed over this shaved area. The animals are then placed in narrow cages of fine wire mesh which leave free in each case the shaved area of the back. While in these narrow wire cages, the guinea pigs are placed for 10 minutes in larger cages, in which several thousand hungry mosquitoes are flying about. Of course, the wire mesh openings of the narrow cages are large enough to permit entry of the mosquitoes thereinto while the wire mesh openings of the larger cages are small enough to prevent escape of the mosquitoes therefrom. The guinea pigs are observed during this time to see whether the mosquitoes bite them on the treated area. The placing of the guinea pig cages into the larger cages for 10-minute observation periods while exposed to the mosquitoes is repeated every hour.

The repellent action is regarded as terminated when the guinea pig is bitten by more than one mosquito during the period of observation.

The particular active compounds, test insect and duration of the repellent effect can be seen from the following Table 1:

TABLE 1.—REPELLENT TEST/MOSQUITOES

| Active Compound | Test Insect | Duration of repellent effect in hours |
| --- | --- | --- |
| (A) Dimethyl phthalate (known) | *Aedes aegypti* | 8 |
| (B) m-Toluylic acid-N,N-diethylamide (known) | do | 14 |
| (C) Caprylic acid diethylamide (known) | do | 9 |
| (III) 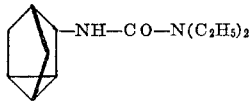 —NH—CO—N(C$_2$H$_5$)$_2$ | do | 41 |
| (IV) 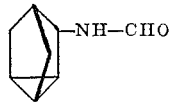 —NH—CHO | do | 17 |
| (V) 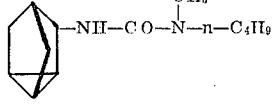 —NH—CO—N(CH$_3$)—n—C$_4$H$_9$ | do | 23 |
| (VI)  —NH—CO—N(CH$_2$—CH=CH$_2$)$_2$ | do | 32 |

EXAMPLE 2

Repellent test/stinging flies

Test insect: *Stomoxys calcitrans*
Solvent: ethanol

To produce a suitable preparation of the particular active compound, 5 parts by weight of such active compound are mixed with 100 parts by volume of the solvent.

The hair is shaved off from the backs of guinea pigs to an extent of 50 cm.$^2$, and 0.4 cc. of such preparation of the given active compound is uniformly distributed over this shaved area. The animals are then placed in narrow cages of fine wire mesh which leave free in each case the shaved area of the back. While in these narrow wire cages, the guinea pigs are placed for 10 minutes in larger cages in which several hundred hungry stinging flies are flying about. Of course, the wire mesh openings of the narrow cages are large enough to permit entry of the flies thereinto while the wire mesh openings of the larger cages are small enough to prevent escape of the flies therefrom. The guinea pigs are observed during this time to see whether the stinging flies bite them on the treated area. The placing of the guinea pig cages into the larger cages for 10-minute observation periods while exposed to the flies is repeated every hour.

The repellent action is regarded as terminated when the guinea pig is bitten by more than one stinging fly during the period of observation.

The particular active compounds, test insects and duration of the repellent effect can be seen from the following Table 2:

20 g. of nortricyclyl-3-isocyanate are reacted at room temperature with excess dimethylamine in accordance with the procedure of Example 3. There is obtained, in practically quantitative yield, N-(nortricyclyl-3)-N',N'-dimethyl-urea (i.e., N-[tricyclo(2,2,1,0$^{2,6}$)heptyl-3]-N', N'-dimethyl-urea); M.P. 136° C.

In analogous manner, there can be prepared the compounds set out in the following table of amides.

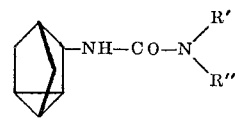

(Ia)

TABLE 2.—REPELLENT TEST/STINGING FLIES

| Active compound | Test Insect | Duration of repellent effect in hours |
|---|---|---|
| (A') Dimethyl phthalate (known) | Stomoxys calcitrans | 2 |
| (V')  —NH—CO—N(CH$_3$)—n-C$_4$H$_9$ | do | 7 |
| (VI')  —NH—CO—N(CH$_2$—CH=CH$_2$)$_2$ | do | 5 |

The following examples are set forth for the purpose of illustrating, while not limiting, the production process for preparing the particular new compounds of the present invention:

EXAMPLE 3

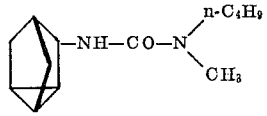

(V")

34 g. of nortricyclyl-3-isocyanate (i.e., N-[tricyclo(2,2,1,0$^{2,6}$)heptyl-3]-isocyanate are added dropwise at room temperature to a solution of 22 g. of methyl-n-butylamine in 150 ml. of anhydrous benzene. The mixture is allowed to react for 3 hours at 50° C. and the solvent then removed. There remain 51 g. of a viscous reaction product which, according to the infrared spectrum and elementary analysis, has the above structure (i.e., N-[tricyclo(2,2,1,0$^{2,6}$)heptyl-3]-N'-methyl-N'-n-butyl-urea).

Calculated: C, 70.3%; H, 9.91%; N, 12.6%. Found: C, 70.13%, H, 9.76%; N, 12.6%.

The isocyanate used as starting material in this example can be prepared as follows:

A mixture of 105 g. of N-nortricyclyl carbamic acid ethyl ester (i.e., N-[tricyclo(2,2,1,0$^{2,6}$)heptyl-3]-carbamic acid ethyl ester), 150 g. of diphenyl-methane-4,4'-diisocyanate and 30 g. of a polyphenyl-methyl polyisocyanate, such as is obtained by aniline-formaldehyde condensation and subsequent phosgenization, is heated, with mechanical stirring, for several hours at 220° C. under reduced pressure; a colorless liquid thereby distils off. The distillate is fractionally distilled for purification. There are obtained 59 g. of nortricyclyl-3-isocyanate; B.P. 75–76° C./18 mm. Hg.

EXAMPLE 4

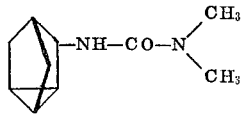

(VII)

| No. | R' | R" | M.P.(°C) |
|---|---|---|---|
| (VIII) | H | H | 148 |
| (IX) | H | ⌬(nortricyclyl) | 269 |
| (III') | C$_2$H$_5$ | C$_2$H$_5$ | 78 |
| (X) | H | n-C$_4$H$_9$ | 156 |
| (XI) | H | i-C$_4$H$_9$ | 208 |
| (XII) | H | tert.-C$_4$H$_9$ | 268 |
| (XIII) | n-C$_3$H$_7$ | n-C$_3$H$_7$ | 103 |
| (XIV) | n-C$_4$H$_9$ | n-C$_4$H$_9$ | 68 |
| (XV) | i-C$_4$H$_9$ | i-C$_4$H$_9$ | 126 |
| (XVI) | CH$_3$ | C$_6$H$_5$ | 80 |
| (XVII) | CH$_3$ | —C$_6$H$_4$—Cl | 230 |
| (XVIII) | C$_2$H$_5$ | naphthyl | 116 |
| (XIX) | C$_2$H$_5$ | —C$_6$H$_4$—Cl | 80 |
| (VI") | —CH$_2$-CH=CH$_2$ | —CH$_2$-CH=CH$_2$ | 45 |
| (XX) | —CH$_2$-CH$_2$-OH | —CH$_2$-CH$_2$-OH | Viscous |
| (XXI) | —CH$_2$—CH$_2$—O—CH$_2$—CH$_2$— | | 174 |
| (XXII) | —CH$_2$—CH$_2$—CH$_2$—CH$_2$— | | 174 |
| (XXIII) | H | —CH$_2$-CH$_2$-OH | Viscous |
| (XXIV) | H | —CH$_2$-CH=CH$_2$ | 133 |
| (XXV) | —CH$_2$—CH$_2$—C(CH$_3$)=CH—CH$_2$— | | 93 |
| (XXVI) | CH$_3$ | —C$_{18}$H$_{37}$ | 60 |

The aforedepicted compounds may be defined as follows:

(VIII) N-[tricyclo(2,2,1,0$^{2,6}$)heptyl-3-urea
(IX) N-[tricyclo(2,2,1,0$^{2,6}$)heptyl-3]-N'[tricyclo(2,2,1,0$^{2,6}$)heptyl-3']-urea
(III) N-[tricyclo(2,2,1,0$^{2,6}$)heptyl-3]-N',N'-diethyl-urea
(X) N-[tricyclo(2,2,1,0$^{2,6}$)heptyl-3]-N'-n-butyl-urea
(XI) N-[tricyclo(2,2,1,0$^{2,6}$)heptyl-3]-N'-isobutyl-urea (XII) N-[tricyclo(2,2,1,0$^{2,6}$)heptyl-3]-N'-tert.-butyl-urea
(XIII) N-[tricyclo(2,2,1,0$^{2,6}$)heptyl-3]-N',N'-di-n-propyl-urea
(XIV) N-[tricyclo(2,2,1,0$^{2,6}$)heptyl-3]-N',N'-di-n-butyl-urea
(XV) N-[tricyclo(2,2,1,0$^{2,6}$)heptyl-3]-N',N'-di-isobutyl-urea
(XVI) N-[tricyclo(2,2,1,0$^{2,6}$)heptyl-3]-N'-methyl-N'-phenyl urea
(XVII) N-[tricyclo(2,2,1,0$^{2,6}$)heptyl-3]-N'-methyl-N'-(4'-chlorophenyl)-urea
(XVIII) N-[tricyclo(2,2,1,0$^{2,6}$)heptyl-3]-N'-ethyl-N'-(1'-naphthyl)-urea
(XIX) N-[tricyclo(2,2,1,0$^{2,6}$)heptyl-3]-N'-ethyl-N'-(2'-chloro-phenyl)-urea
(VI) N-[tricyclo(2,2,1,0$^{2,6}$)heptyl-3]-N',N'-di(γ-allyl)-urea
(XX) N-[tricyclo(2,2,1,0$^{2,6}$)heptyl-3]-N',N'-di(β-hydroxyethyl)-urea
(XXI) N-[tricyclo(2,2,1,0$^{2,6}$)heptyl-3]-N',N'-(3'-oxa-pentylene-1',5')-urea
(XXII) N-[tricyclo(2,2,1,0$^{2,6}$)heptyl-3]-N',N'-(pentyl-ene-1',5')-urea
(XXIII) N-[tricyclo(2,2,1,0$^{2,6}$)heptyl-3]-N'-(β-hydroxyethyl)-urea
(XXIV) N-[tricyclo(2,2,1,0$^{2,6}$)heptyl-3]-N'-(-allyl)-urea
(XXV) N-[tricyclo(2,2,1,0$^{2,6}$)heptyl-3]-N',N'-[3'-methylpenten-(3')-ylene-1',5']-urea
(XXVI) N-[tricyclo(2,2,1,0$^{2,6}$)heptyl-3]-N'-methyl-N'-octadecyl-urea.

EXAMPLE 5

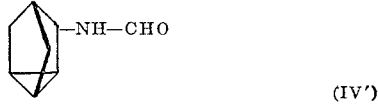

(IV')

109 g. of 3-amino-nortricyclene (i.e., [tricyclo(2,2,1,0$^{2,6}$)heptyl-3]-amine) and 240 g. of methyl formate are heated for 6 hours in an autoclave at 110° C. The reaction product is subsequently distilled. There are obtained 106 g. of 3-formyl-amino-nortricyclene (i.e., N-[tricyclo(2,2,1,0$^{2,6}$)heptyl-3]-formamide); B.P. 159–161° C./15 mm. Hg.

The 3-amino-nortricyclene used as starting material in this example can be prepared in the following manner:

181 g. of nortricyclyl carbamic acid ethyl ester (i.e., N-[tricyclo(2,2,1,0$^{2,6}$)heptyl-3]-cabamic acid ethyl ester) and 125 g. of potassium hydroxide are dissolved in 500 g. of 50% alcohol and heated in an autoclave for 6 hours at 150° C. The reaction mixture obtained consists of two layers. The upper layer is separated and the bulk of the alcohol contained therein is distilled off. The liquid residue is combined with the lower layer and extracted several times by shaking with benzene. The benzene solutions are combined and dried, then the solvent is removed and the residue distilled. There are obtained 62 parts by weight of nortricyclyl-3-amine; B.P. 51–56° C./14 mm. Hg.

EXAMPLE 6

Using corresponding molar amounts of nortricyclyl-3-isocyanate and:

(A) vinyl-amine;
(B) N,N-di(1-methyl-2,3-dichloro-3-hydroxy) propyl-amine;
(C) N-(3-chloro-n-propyl)-N-(1-chloro-allyl) amine;
(D) N-(5-hydroxy-penten-3-yl)-N-(5-ethyl-6-chloro-hexen-3-yl) amine;
(E) N-(2,7-dibromo-4-chloro-6-s-butyl-naphthyl)-N-(1-bromo-4-hydroxy phenyl)amine;
(F) 3-methyl-5,5-dichloro-piperidine;
(G) N-(butyn-3-yl)-N-(3-chloro-hexyn-5-yl)amine, and (H) N-(cyclohexyl)-N-(2-bromo-4-isopropyl-cyclohexyl)amine, respectively, the following final products are obtained:

(A') N-[tricyclo(2,2,1,0$^{2,6}$)heptyl-3]-N'-vinyl-urea;
(B') N-[tricyclo(2,2,1,0$^{2,6}$)heptyl-3]-N',N'-di(1'-methyl-2',3'-dichloro-3'-hydroxy)propyl-urea;
(C') N-[tricyclo(2,2,1,0$^{2,6}$)heptyl-3]-N'-(3'-chloro-n-propyl)-N'-(1'-chloro-allyl)-urea;
(D') N-[tricyclo(2,2,1,0$^{2,6}$)heptyl-3]-N'-[5'-hydroxy-penten-(3')-yl]-N'-[5'-ethyl-6'-chloro-hexen-(3')-yl]-urea;
(E') N-[tricyclo(2,2,1,0$^{2,6}$)heptyl-3]-N'-(2',7'-dibromo-4'-chloro-6'-s-butyl-naphthyl)-N'-(1'-bromo-4'-hydroxy-phenyl)-urea;
(F') N-[tricyclo(2,2,1,0$^{2,6}$)heptyl-3]-N',N'-(3'-methyl-5',5'-dichloro-pentylene-1',5')-urea;
(G') N-[tricyclo(2,2,1,0$^{2,6}$)heptyl-3]-N'-[butyn-(3')-yl]-N'-[3'-chloro-hexyn-(5')-yl]-urea; and
(H') N-[tricyclo(2,2,1,0$^{2,6}$)heptyl-3]-N'-cyclohexyl-N'-(2'-bromo-4'-isopropyl-cyclohexyl)-urea.

Advantageously, in accordance with the present invention, in the foregoing formulae: R represents hydrogen or the radical

in which R' and R" each respectively represents hydrogen; alkyl having 1–18 carbon atoms, such as methyl, ethyl, n-propyl, isopropyl, n-butyl, iso-butyl, sec.-butyl, tert.-butyl, n-amyl, iso-amyl, n-hexyl, iso-hexyl, heptyl, octyl, nonyl, decyl, undecyl, dodecyl, tri-decyl, tetra-decyl, penta-, hexa-, hepta- and octa- decyl, and the like, preferably lower alkyl, especially having 1–4 carbon atoms; alkenyl having 2–6 carbon atoms, such as vinyl, α-, β- and γ-allyl, butenyl, pentenyl, hexenyl, and the like, preferably lower alkenyl; alkynyl having 2–6 carbon atoms, such as ethynyl, propynyl, butynyl, pentynyl, hexynyl, and the like, preferably lower alkynyl; cycloalkyl having 5–6 carbon atoms, such as cyclopentyl, cyclohexyl, and the like; phenyl; naphthyl; nortricyclyl alkanes, such as nortricyclyl heptane, with the provision that R' and R" when taken together with the adjacent N-atom form a heterocyclic radical having 5–6 ring members, optionally containing an oxygen linking atom in the ring such as piperidino, morpholino, 4-methyl-2,5,6-trihydro-pyridyl or 4 - methyl - cyclo - 1 - aza - hexen - (3) - yl - 1, 4 - methyl-2,2-dichloro-cyclo-1-aza-hexyl-1, and the like; and Substituted alkyl, alkenyl, alkynyl, cycloalkyl, phenyl, naphthyl, nortricyclyl and heterocyclic radicals of the foregoing type which are substituted with hydroxy, halo, such as chloro, bromo, iodo and fluoro, especially chloro and/or bromo, and alkyl having 1–4 carbon atoms, such as methyl, ethyl, n-propyl, iso-propyl to tert.-butyl, including as substituents mono-, di- and poly- as well as mixed substituents of the mentioned types.

Preferably, R is hydrogen or the radical

in which each of R' and R" is a lower alkyl radical having 1–4 carbon atoms or a lower alkenyl having 2–4 carbon atoms.

All of the foregoing compounds possess the desired strong insect and/or mite repelling properties whereby such particular new compounds are usable effectively against arthropods, especially of the noxious, sucking and biting types, yet despite the strong repellent activity of such compounds, the same possess a markedly low toxicity towards warm-blooded creatures, enabling the compounds to be applied directly to the human skin and clothing.

It will be appreciated that the instant specification and examples are set forth by way of illustration and not limitation, and that various modifications and changes may be made without departing from the spirit and scope of the present invention.

What is claimed is:
1. Nortricyclic-3-amide having the formula

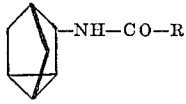

in which R represents a member selected from the group consisting of hydrogen and the radical

in which R' is selected from the group consisting of hydrogen, lower alkyl, alkenyl having 2–6 carbon atoms, alkynyl having 2–6 carbon atoms, cycloalkyl having 5–6 carbon atoms, phenyl, naphthyl, nortricycloheptyl, lower alkyl which is substituted with a member selected from the group consisting of at least one of hydroxy and halo, such alkenyl which is substituted with a member selected from the group consisting of at least one of halo, alkyl having 1–4 carbon atoms and hydroxy, halo-substituted alkynyl having 2–6 carbon atoms, $C_{1-4}$ alkyl-halo-substituted cycloalkyl having 5–6 ring carbon atoms, phenyl which is substituted with a substituent selected from the group consisting of at least one of hydroxy and halo, and naphthyl which is substituted with at least one substituent selected from the group consisting of halo and alkyl having 1–4 carbon atoms; and R" is selected from the group consisting of hydrogen, linear alkyl having 1–18 carbon atoms, alkenyl having 2–6 carbon atoms, alkynyl having 2–6 carbon atoms, cycloalkyl having 5–6 carbon atoms, phenyl, naphthyl, nortricycloheptyl, lower alkyl which is substituted with a member selected from the group consisting of at least one of hydroxy and halo, such alkenyl which is substituted with a member selected from the group consisting of at least one of halo, alkyl having 1–4 carbon atoms and hydroxy, halo-substituted alkynyl having 2–6 carbon atoms, $C_{1-4}$ alkyl-halo-substituted cycloalkyl having 5–6 ring carbon atoms, phenyl which is substituted with a substituent selected from the group consisting of at least one of hydroxy and halo, and naphthyl which is substituted with at least one substituent selected from the group consisting of halo and alkyl having 1–4 carbon atoms, with the proviso that R' and R" when taken together with the adjust N atom form a hetero-cyclic radical having 5–6 ring members selected from the group consisting of piperidino, morpholino, 4-methyl-2,5,6-trihydropyridyl and 4-methyl-2,2-dichloro-cyclo-1-azahexyl-1.

2. Amide according to claim 1 wherein R' is selected from the group consisting of hydrogen, lower alkyl, $C_{2-6}$ alkenyl, $C_{2-6}$ alkynyl, $C_{5-6}$ cycloalkyl, phenyl, naphthyl, nortricycloheptyl, lower alkyl which is substituted with a member selected from the group consisting of at least one of hydroxy and chloro, $C_{2-6}$ alkenyl which is substituted with a member selected from the group consisting of at least one of chloro, $C_{1-4}$ alkyl and hydroxy, chloro substituted $C_{2-6}$ alkynyl, $C_{1-4}$ alkyl-bromo-substituted $C_{5-6}$ cycloalkyl, chloro-substituted phenyl, hydroxy-bromo-substituted phenyl, and $C_{1-4}$ alkyl-chloro-bromo-substituted naphthyl, R" is selected from the group consisting of hydrogen, $C_{1-13}$ linear alkyl, $C_{2-6}$ alkenyl, $C_{2-6}$ alkynyl, $C_{5-6}$ cycloalkyl, phenyl, naphthyl, nortricycloheptyl, lower alkyl which is substituted with a member selected from the group consisting of at least one of hydroxy and chloro, $C_{2-6}$ alkenyl which is substituted with a member selected from the group consisting of at least one of chloro, $C_{1-4}$ alkyl and hydroxy, chloro substituted $C_{2-6}$ alkynyl, $C_{1-4}$ alkyl-bromo-substituted $C_{5-6}$ cycloalkyl, chloro-substituted phenyl, hydroxy-bromo-substituted phenyl, and $C_{1-4}$ alkyl- chloro-bromo-substituted naphthyl, and said heterocyclic radical is selected from the group consisting of piperidino, morpholino, 4-methyl-2,5,6-trihydropyridyl and 4-methyl-2,2-dichloro-cyclo-1-azahexyl-1.

3. Amide according to claim 1 wherein such compound is N-[tricyclo(2,2,1,0$^{2,6}$)heptyl-3]-formamide having the formula

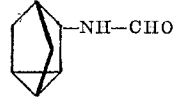

4. Amide according to claim 1 wherein such compound is N-[tricyclo(2,2,1,0$^{2,6}$)heptyl-3]-N',N'-diethyl-urea having the formula

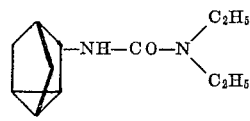

5. Amide according to claim 1 wherein such compound is N-[tricyclo(2,2,1,0$^{2,6}$)heptyl-3] - N' - methyl-N'-n-butyl-urea having the formula

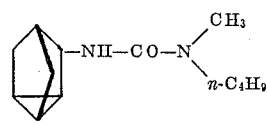

6. Amide according to claim 1 wherein such compound is N-[tricyclo(2,2,1,0$^{2,6}$)heptyl-3]-N',N'-di(-allyl)-urea having the formula

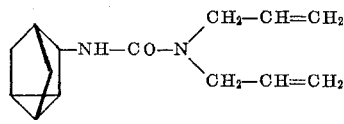

7. Amide according to claim 1 wherein such compound is N - [tricyclo(2,2,1,0$^{2,6}$)heptyl - 3]-N'-methyl-N'-(4'-chlorophenyl)-urea having the formula

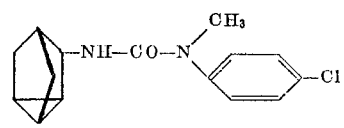

8. Amide according to claim 1 wherein such compound is N - [tricyclo(2,2,1,0$^{2,6}$)heptyl-3]-N'-(β-hydroxyethyl)-urea having the formula

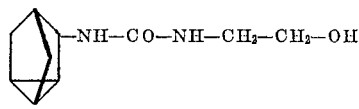

9. Amide according to claim 1 wherein such compound is N-[tricyclo(2,2,1,0$^{2,6}$)heptyl-3]-N',N'-[3'-methyl-penten-(3')-ylene-1',5']-urea having the formula

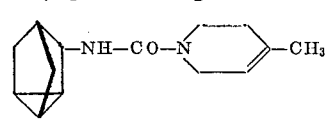

References Cited
UNITED STATES PATENTS

| | | | |
|---|---|---|---|
| 3,174,843 | 3/1965 | Buntin et al. | 260—553 |
| 3,350,194 | 10/1967 | Buntin | 260—553 |

HENRY R. JILES, Primary Examiner

A. L. ROTMAN, Assistant Examiner

U.S. Cl. X.R.

260—247.2, 294, 453, 553, 561; 424—248, 266, 267, 322

PO-1050
(5/69)

UNITED STATES PATENT OFFICE
CERTIFICATE OF CORRECTION

Patent No. 3,462,445      Dated August 19, 1969

Inventor(s) Gerhard Muller and Wolfgang Behrenz

It is certified that error appears in the above-identified patent and that said Letters Patent are hereby corrected as shown below:

Column 1, line 25, "nortricyclyl-2-amides" should read --nortricyclyl-3-amides--

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents